United States Patent [19]

Eckert

[11] Patent Number: 4,462,343

[45] Date of Patent: Jul. 31, 1984

[54] CYLINDER FOR RECIPROCATING PISTON ENGINES

[75] Inventor: Rolf Eckert, Bergisch Gladbach, Fed. Rep. of Germany

[73] Assignee: Klöckner-Humboldt-Deutz Aktiengesellschaft, Köln, Fed. Rep. of Germany

[21] Appl. No.: 294,829

[22] Filed: Aug. 21, 1981

[30] Foreign Application Priority Data

Aug. 23, 1980 [DE] Fed. Rep. of Germany ....... 3031926

[51] Int. Cl.³ ............................................ F16J 10/02

[52] U.S. Cl. .......................... 123/41.69; 123/193 CH; 92/170

[58] Field of Search ......................... 92/169, 171, 170; 123/193 C, 193 CH, 193 P, 193 H, 668, 669, 41.69

[56] References Cited

U.S. PATENT DOCUMENTS

| | | | |
|---|---|---|---|
| 1,814,781 | 7/1931 | Bailey | 92/169 |
| 1,872,931 | 8/1932 | Goldsborough | 92/170 |
| 2,577,022 | 12/1951 | Lieberherr | 92/169 |
| 3,408,995 | 11/1968 | Johnson | 123/668 |
| 3,410,256 | 11/1968 | Herschmann | 92/171 |
| 3,880,055 | 4/1975 | Nakomura et al. | 92/170 |

FOREIGN PATENT DOCUMENTS

| | | | |
|---|---|---|---|
| 2729230 | 1/1979 | Fed. Rep. of Germany | 123/668 |

*Primary Examiner*—Paul E. Maslousky

*Attorney, Agent, or Firm*—Becker & Becker, Inc.

[57] ABSTRACT

A cylinder, for reciprocating piston engines, having a ring which is arranged between the cylinder head and the cylinder tube and forms a part of the inner wall of the cylinder. The ring is made of ceramic for heat insulating purposes.

3 Claims, 6 Drawing Figures

CYLINDER FOR RECIPROCATING PISTON ENGINES

The present invention relates to a cylinder for reciprocating piston engines, and has a ring which is arranged between the cylinder head and the cylinder tube and forms a part of the inner wall of the cylinder.

German Offenlegungsschrift No. 26 30 225 discloses a cylinder of this type, according to which a ring, inserted between the cylinder head and the cylinder tube, is made of a material of higher strength and/or higher heat conductivity than the remainder of the cylinder; the object of the ring is to make possible an improved heat dissipation from the cylinder head, and to lower the wall temperature in the region of the highest position of the upper piston ring. A special ribbing or finning under these circumstances serves to further enhance heat transfer to the cooling air. A thus intensified heat dissipation in the region of the combustion chamber wall also has drawbacks. On the one hand, in cold starting operation and partical load operation, one must expect increased fuel condensation and flame extinguishing at the extremely cooled cylinder inner wall, and hence increased hydrocarbon emission. On the other hand, the efficiency is decreased as a result of the strong heat dissipation as a consequence of the reduced combustion chamber temperature.

It is an object of the present invention, in contrast to the described arrangement, to reduce the heat dissipation through the cylinder wall in the region of the combustion chamber in order to increase the efficiency, and to increase the combustion chamber wall temperature in order to reduce th hydrocarbon emissions during cold starting operation and in partial load operation. Stresses between the cylinder head and the cylinder tube because of different thermal expansions are to be reduced as much as possible.

This object, and other objects and advantages of the present invention, will appear more clearly from the following specification in connection with the accompanying drawing, in which.

Figures 1A, 1B:
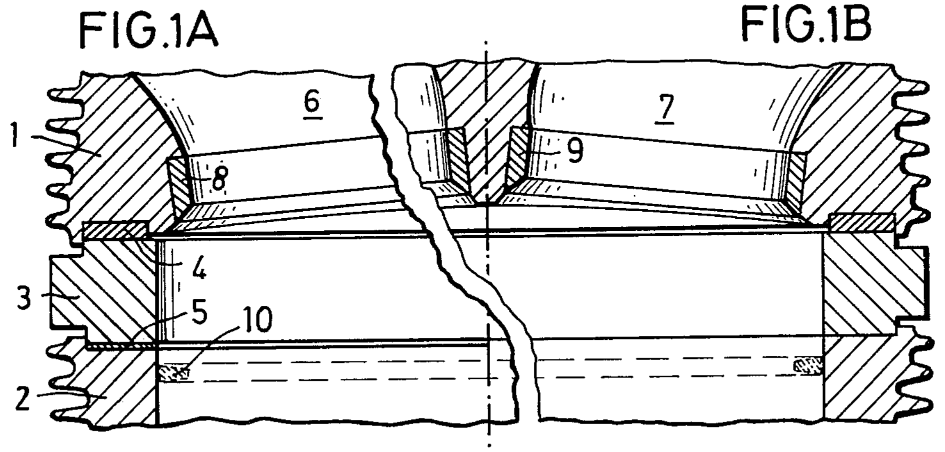
FIGS. 1A and 1B show two embodiments of an inventive, externally cylindrical, ring which is completely accessible to cooling air and is arranged between the cylinder head and the cylinder tube.

The cylinder of the present invention is characterized primarily in that the ring is made of ceramic for heat insulating purposes. Although it is known to use ceramic as a good heat insulating material, only now with the inventive application thereof as a heat insulating ring, is the ceramic suitable for for the sought goals in an especially advantageous manner. The great forces exerted by the cylinder head screws are effective exclusively as pressure or compressive forces upon the ceramic part, the material of which is well suited for receiving or absorbing such forces. The forces caused by the combustion chamber pressure bring about an undesired tensile stress in the material which, however, due to the ring shape, is distributed completely uniformly. In this connection, the ring is preferably embodied in such a way that it is not overlapped or overrun by the upper piston ring, which could lead to damage even with very slight overlap. At the same time, this measure assures that the upper piston ring, in the upper dead center position, engages a well cooled part of the combustion chamber wall, so that an overheating, with the attendant danger of carbon deposits, is avoided.

Radial stresses between the cylinder head and the heat insulating ring are inventively reduced by an annular disc placed therebetween which forms two slide surfaces or planes for microshifting; the same effect can be attained for stresses between the cylinder tube and the heat insulating ring by an additional annular disc. Steel plate is well suited as a material for this purpose.

The attained results can be still further enhanced by different embodiments of the ring. Thus, for example, the mentioned stresses can be even better reduced by dividing the ring in planes at right angles to the axis thereof. Consequently, further slide surfaces or planes result.

In the simplest embodiment, the ceramic ring, with suitable fitting or adaptation parts, is simply inserted between the cylinder head and the cylinder tube, and is exposed entirely or partially to the cooling medium. In another embodiment, which offers different advantages, the ring is externally sealingly surrounded by the cylinder head and/or the cylinder tube. In this way, insulation against loss of heat is assured for the combustion chamber, while the surface which serves for heat dissipation from the cylinder head and the lower part of the cylinder tube, and which is in heat conductive connection therewith, is increased by the external metallic jacketing of the heat insulating ring. This is especially true when this surrounding jacket is likewise provided with cooling ribs or fins. The cylinder head and the cylinder tube can be connected with one another in a conventional manner, or can also be shrink-fitted, screwed, or welded to one another. In a particular arrangement of this variation, the ring can be separated by a radial cut, and can be installed so as to be pressed together under inherent internal tension; in this way abutting connection is assured between the surrounding part and the heat insulating ring, even during considerable heat expansion of the surrounding head or cylinder tube. If the ring is also multiply divided, especially in planes perpendicular to the axis of the cylinder, the partial rings, for better sealing, can be installed insuch a way that their butt joints are offset relative to one another. To clearly reduce the heat transfer to the outside, the outer side of the ring is inventively smooth and cylindrical, even with an otherwise ribbed or finned cylinder tube.

With an externally jacketed ring, it can be especially advantageous if the outer side of the ring expands or widens, entirely or partially, conically toward the cylinder head, as a result of which on the one hand the wall thickness of the ceramic ring is adapted to the gas pressure distribution, and on the other hand the heat flow cross section of the jacketing is improved for cooling the piston ring reversing zone.

Referring now to the drawing in detail, FIGS. 1A and 1B are sections through the cylinder axis of the cylinder head 1, the cylinder tube or casing 2, and the ceramic ring 3. An annular disc 4 is located between the ring 3 and the cylinder head 1. In the embodiment of FIG. 1A, a further annular plate 5 is provided between the ring 3 and the cylinder tube 2. The intake port 6 and exhaust port 7, having valve seats 8 and 9 respectively, are provided in the cylinder head 1. Reference numeral 10 designates the position of the upper piston ring in top dead center position.

Figures 2A, 2B:
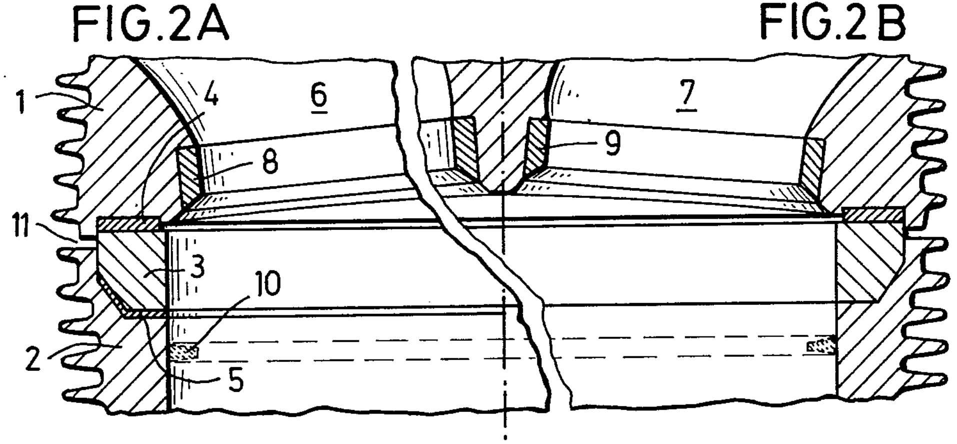
FIGS. 2A and 2B show two embodiments of an externally partially conical ring which is accessible to cooling air via a gap.

The details shown in FIGS. 2A and 2B are designated with the same reference numerals as in FIGS. 1A and 1B to the extent shown. A gap 11 for access of cooling air to the ring 3 is located between the cylinder head-/and the cylinder tube 2.

Figures 3A, 3B:
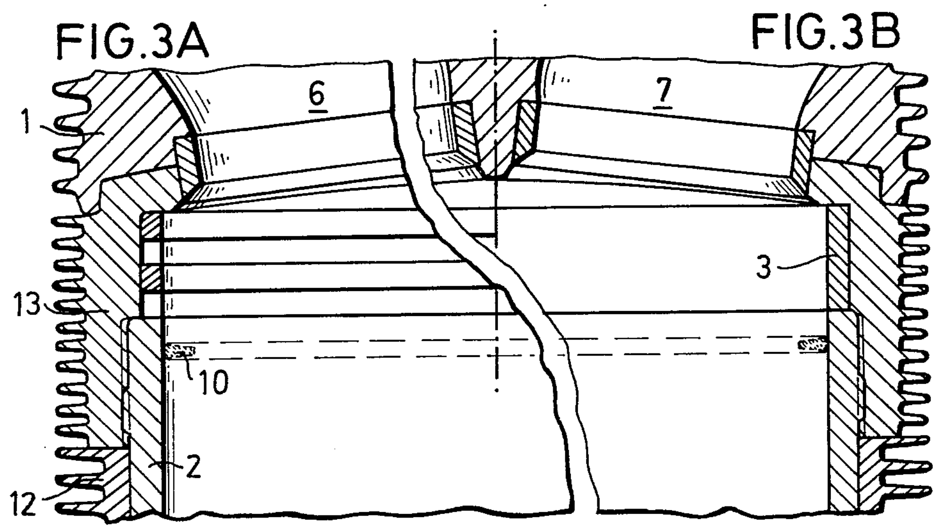
FIGS. 3A and 3B show two embodiments of a ring surrounded externally by a part of the cylinder tube.

The cylinder tube 2 of FIGS. 3A and 3B is provided with a forced-on ribbed or finned tube or casing 12, and a screwed-on ribbed or finned head part 13. The head part 13 of the cylinder tube 2 is positively connected with the cylinder head 1, and completely surrounds the ceramic ring 3. The ring 3 of FIG. 3A is divided horizontally four times, and is illustrated installed with vertical separation with offset butt joints, while in FIG. 3B the ring 3 is embodied in one piece.

The present invention is, of course, in no way restricted to the specific disclosure of the specification and drawings but also encompasses any modifications within the scope of the appended claims.

What I claim is:

1. A cylinder for reciprocating piston internal combustion engines with a combustion chamber subject to cold starting operation and partial load operation having hydrocarbon emissions as well as having stresses because of different thermal expansions associated therewith, said cylinder having an inner wall as well as a combustion chamber wall therewith and comprising in combination:

a cylinder head;

a cylinder tube; and a ring arranged between said cylinder head and said cylinder tube, said ring forming a part of said inner wall of said cylinder, and said ring to prevent heat conductance being made of ceramic for heat insulating purposes to reduce heat dissipation through the cylinder wall in the region of the combustion chamber in order to increase efficiency so that during cold starting operation and partial load operation also there are reduced hydrocarbon emissions with an increase of combustion chamber wall temperature, and a gap structure including said ceramic ring located for access of cooling medium to said ceramic ring between said cylinder head and said cylinder tube to assure vertical separation of said head and tube due to said ceramic ring without any direct engagement existing between said head end tube said ceramic ring interrupting heat flow between said cylinder head and said cylinder tube along with stresses between the cylinder head and cylinder tube because of different thermal expansions being reduced as much as possible, and further including an annular disc arranged between said cylinder head and said ring, said annular disc forming slide surfaces for micro-shifting to reduce radial stresses between the cylinder head and the heat insulating ring 2. A cylinder in combination according to claim 1, in which a radially outer side of said ring is at least partially exposed to said cooling medium which is air.

3. A cylinder in combination according to claim 1, in which a radially outer side of said ring is smooth and cylindrical.

* * * * *